US009256680B2

(12) United States Patent
Kumaran

(10) Patent No.: US 9,256,680 B2
(45) Date of Patent: Feb. 9, 2016

(54) BIASING SEARCH RESULTS TOWARD TOPICS OF INTEREST USING EMBEDDED RELEVANCE LINKS

(75) Inventor: Giridhar Kumaran, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 13/364,330

(22) Filed: Feb. 2, 2012

(65) Prior Publication Data
US 2013/0204892 A1 Aug. 8, 2013

(51) Int. Cl.
*G06F 17/30* (2006.01)

(52) U.S. Cl.
CPC .... *G06F 17/30864* (2013.01); *G06F 17/30648* (2013.01)

(58) Field of Classification Search
CPC ................... G06F 17/30864; G06F 17/30867; G06F 17/3089; G06F 17/3053; G06F 17/03–17/648; G06F 17/30899; G06F 17/3064
USPC .......................................... 707/759, 764–767
See application file for complete search history.

(56) References Cited

U.S. PATENT DOCUMENTS

| | | | |
|---|---|---|---|
| 7,231,381 B2 * | 6/2007 | Li et al. .......................... | 707/766 |
| 7,707,220 B2 | 4/2010 | Bonabeau et al. | |
| 7,844,599 B2 | 11/2010 | Kasperski et al. | |
| 7,966,309 B2 * | 6/2011 | Shacham et al. ............... | 707/708 |
| 7,966,321 B2 * | 6/2011 | Wolosin et al. ................ | 707/728 |
| 8,346,791 B1 * | 1/2013 | Shukla et al. .................. | 707/759 |
| 8,489,591 B2 * | 7/2013 | Wolosin et al. ................ | 707/728 |
| 8,849,785 B1 * | 9/2014 | Shattuck ........................ | 707/706 |
| 2006/0206460 A1 | 9/2006 | Gadkari | |
| 2006/0212423 A1 | 9/2006 | Jones et al. | |
| 2009/0083232 A1 | 3/2009 | Ives et al. | |
| 2010/0082610 A1 | 4/2010 | Anick et al. | |
| 2010/0205172 A1 | 8/2010 | Luk | |
| 2010/0257164 A1 * | 10/2010 | Halverson et al. ............. | 707/725 |
| 2011/0040787 A1 * | 2/2011 | Cierniak et al. ............... | 707/770 |

OTHER PUBLICATIONS

"International Search Report", Mailed Date: May 15, 2013, Application No. PCT/US2013/023522, Filed date: Jan. 29, 2013, pp. 11.
Hoeber, et al., "Visualization Support for Interactive Query Refinement", Web Intelligence, Proceedings of the 2005 IEEE/WIC/ACM International Conference, Sep. 19, 2005, pp. 9.

(Continued)

*Primary Examiner* — Monica Pyo
(74) *Attorney, Agent, or Firm* — David Ream; Doug Barker; Micky Minhas

(57) ABSTRACT

Redirection ("biasing") architecture that automates the selection of topical terms in a search query, and provides a user-selectable (e.g., clickable) interface which enables the user to quickly and easily re-formulate and execute a new query using terms that return more focused search results. The redirection of search by biasing the terms (strings) can also be performed by indicating that certain results are not interesting to the user. For example, one way using an existing search engine, is to apply a search operator (e.g., a hyphen) to indicate that certain terms must not occur in the search results (negation). Accordingly, by automatically selecting topical terms to negate, constructing a query, and embedding the negation in a link with each results page result, considerable manual and cognitive effort is saved.

19 Claims, 10 Drawing Sheets

(56) References Cited

OTHER PUBLICATIONS

Bordogna, et al., "Query Disambiguation Based on Novelty and Similarity User's Feedback", Web Intelligence and Intelligent Agent Technologies, 2009, 2009 IEEE/WIC/ACM International Joint Conference, vol. 3, pp. (125-128).
Jensen, et al., "Query Phrase Suggestion from Topically Tagged Session Logs", Proceedings of the Flexible Query Answering Systems 7th International Conference, FQAS Milan, Italy, Jun. 7, 2006, pp. (185-196).
Kim et al., "Information Retrieval using Word Senses: Root Sense Tagging Approach", Proceedings of the 27th Annual International ACM SIGIR Conference on Research and Development in Information Retrieval, Jul. 25, 2004, pp. 8.
Bharat, Krishna, "SearchPad: Explicit Capture of Search Context to Support Web Search", at <<http://www9.org/w9cdrom/173/173.html>>, Retrieved Date: Nov. 15, 2011.
Vrochidis, et al., "Utilizing Implicit User Feedback to Improve Interactive Video Retrieval", Retrieved at http://downloads.hindawi.com/journals/am/2011/310762.pdf>>, Proceedings of Hindawi Publishing Corporation, Advances in Multimedia, vol. 2011, Jan. 3, 2011.
Kaptein, et al., "The Impact of Positive, Negative and Topical Relevance Feedback", Retrieve at <<http://www.dtic.mil/cgi-bin/GetTRDoc?AD=ADA512722&Location=U2&doc=GetTRDoc.pdf >>, Proceedings: Seventeenth Text REtrieval Conference, Nov. 18-21, 2008.

\* cited by examiner

⟵ 300

Grey Goose (vodka) - Wikipedia, the free encyclopedia
Grey Goose is a Bermudian-owned brand of premium priced vodka produced in France. It is distilled in Cognac, France from French wheat and exported to the United States by the ...
302 ⟶ en.wikipedia.org/wiki/Grey_Goose_(vodka) · Cached page · Mark as spam · More / None like this

The Grey Goose - Home
The Grey Goose is a continental style restaurant serving Lunch and Breakfast. The Grey Goose is located at 101-A West Queens Way, Hampton, VA 23669
306 ⟶ greygooserestaurant.com · Cached page · Mark as spam

Grey Goose Framing
L.A.'s most progressive frame shop since 1981. 1170 S. La Brea Ave, 1941 ...
www.greygooseframing.com · Cached page · Mark as spam · More / None like this

Anser (bird) - Wikipedia, the free encyclopedia
Systematics, taxonomy ... · Relationship with ... · Footnotes
The waterfowl genus Anser includes all grey geese and usually the white geese too. It belongs to the true geese and swan subfamily. The genus has a Holarctic distribution ...
304 ⟶ en.wikipedia.org/wiki/Grey_goose · Cached page · Mark as spam · More / None like this

Grey Goose: Information from Answers.com
"Grey Goose" is a traditional American folk song. It was recorded by Huddie Ledbetter (aka Lead Belly) in the 1930s. An instrumental version of this song was covered by ...
www.answers.com/topic/grey-goose-1 · Cached page · Mark as spam

Grey Goose Farm Lodge - Home Page
Are you looking for accommodation, wedding or conferencing facilities, horse riding, eco-tours or game drives in Newcastle, Kwa Zulu Natal? Well you have come to the right place.
greygoose.co.za/index.php · Cached page · Mark as spam · More / None like this

Grey Goose Framing
L.A.'s most progressive frame shop since 1981. 1170 S. La Brea Ave, 1941 ...
www.greygooseframing.com · Cached page · Mark as spam · More / None like this

Grey Goose Custom Framing - Los Angeles, California (CA) | Company ...
Grey Goose Custom Framing company profile in Los Angeles, CA. Our free company profile report for Grey Goose Custom Framing includes business information such as contact, sales and ...
www.manta.com/c/mmc0x6/grey-goose-custom-framing · Cached page · Mark as spam · More / None like this

Grey Goose Custom Framing (Steve Szlopek) - Los Angeles ...
Grey Goose Custom Framing company profile in Los Angeles, CA. Our free company profile report for Grey Goose Custom Framing includes business information such as contact, sales and ...
www.manta.com/c/mm0g61q/grey-goose-custom-framing · Cached page · Mark as spam · More / None like this

Grey Goose Custom Framing Los Angeles, CA 90019 - YP.COM
[Map] · 0 reviews · 1170 S La Brea Ave, Los Angeles, CA 90019
Please Visit Our Website For More Information Extra Phones/Fax 650 S. Olive St LA. 90014; (213) 622-5622 1941 Hillhurst Ave LA. 90027; (323) 664-6055 111 N. La Brea Ave LA ...
www.yellowpages.com/los-angeles-ca/mip/grey-goose-custom-framing-10210887 · Cached page · Mark as spam · More / None like this

Grey Goose Custom Framing in Los Angeles, CA | 1941 Hillhurst Ave ...
Grey Goose Custom Framing in Los Angeles, CA – Map, Phone Number, Reviews, Photos and Video Profile for Los Angeles Grey Goose Custom Framing. Grey Goose Custom Framing appears in ...
www.superpages.com/bp/Los-Angeles-CA/Grey-Goose-Custom-Framing-L0117475294.htm · Cached page · Mark as spam · More / None like this

Grey Goose (vodka) - Wikipedia, the free encyclopedia
Grey Goose is a Bermudian-owned brand of premium priced vodka produced in France. It is distilled in Cognac, France from French wheat and exported to the United States by the ...
en.wikipedia.org/wiki/Grey_Goose_(vodka) · Cached page · Mark as spam · More / None like this BGB Connections - Login
BACARDI, the Bat Device and all other marks appearing on the Bacardi Group products shown and/or quoted in this website are trademarks and/or registered trademarks of Bacardi ...
https://www.greygoose.com · Cached page · Mark as spam · More / None like this The Grey Goose - Home
The Grey Goose is a continental style restaurant serving Lunch and Breakfast. The Grey Goose is located at 101-A West Queens Way, Hampton, VA 23669
greygooserestaurant.com · Cached page · Mark as spam Shop for grey goose -framing

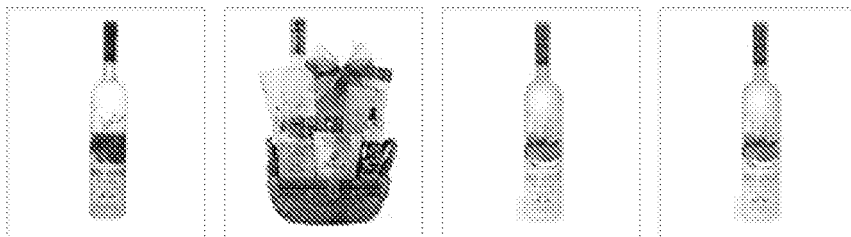

Grey Goose, Vodka (France) from $28.99  
Grey Goose Vodka Gift Basket $99.00  
Grey Goose Vodka 200ml $9.99  
Grey Goose Vodka 375ml $17.49 bing.com/shopping

THE GREY GOOSE MANSION
greygoosemansion.com · Cached page · Mark as spam · More / None like this Grey Goose Farm Lodge - Home Page
Are you looking for accommodation, wedding or conferencing facilities, horse riding, eco-tours or game drives in Newcastle, Kwa Zulu Natal? Well you have come to the right place.
greygoose.co.za/index.php · Cached page · Mark as spam · More / None like this

*FIG. 5*

BIASING SEARCH RESULTS TOWARD TOPICS OF INTEREST USING EMBEDDED RELEVANCE LINKS

BACKGROUND

For queries that are ambiguous (e.g., the term jaguar possibly referring to both an animal and a car) or lead to results on various disparate topics, the user typically has to manually reformulate the query to redirect the query towards the actual intent or the topic of interest. This query redirection is usually done after the user has scanned through the results shown on the search engine results page for clues on the terms to be added. The user then manually enters additional terms into the search box and issues a new query in the hope of getting more information on the topic of interest.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed redirection ("biasing") architecture automates the addition of topical terms to a search query, and provides a user-selectable (e.g., clickable) interface which enables the user to quickly and easily re-formulate and execute a new query using terms that return more focused search results.

The redirection of search can also be performed by indicating that certain results are not interesting to the user. For example, one way using an existing search engine, is to apply a search operator (e.g., a hyphen) to indicate that certain terms must not occur in the search results (negation). Accordingly, by automatically selecting topical terms to negate, constructing a query, and embedding the negation in a link with each results page result, considerable manual and cognitive effort is saved.

In one specific implementation, the user-selectable interface is a "More/None" link that is provided next to each result entry, and that the user can select (e.g., click on) to provide positive/negative feedback on each result and thereby redirect the search toward topics of interest.

In support thereof, an algorithm is provided that picks topical terms from the result entry. The entry can be defined to include metadata such as a caption (which comprises a title and a snippet (a set of descriptive words from the target webpage)), potentially an image, and/or other content, and encodes the topical terms as new queries in the "More/None" link.

Generally, the architecture is a mechanism that provides explicit positive and negative feedback through a link (e.g., annotated in one example as More/None) that enables similar and dissimilar tagging of query terms for a new or reformulated query. Additionally, an algorithm is disclosed for automatic selection of topical terms from the result entries (e.g., title, snippet, etc.). A query created on-the-fly is embedded in the link (e.g., similar and dissimilar) and executed when the link is selected. The architecture also determines when to show a "similar pages" link and when not to show the "similar pages" link.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates original search results of a results page based on an original query and the presence of relevance components for one or more of the results.

FIG. 4 illustrates new search results of a results page based on a new positive feedback query for the original query of FIG. 3.

FIG. 5 illustrates new search results of a results page based on a new negative feedback query for the original query of FIG. 3.

DETAILED DESCRIPTION

Figure 1:
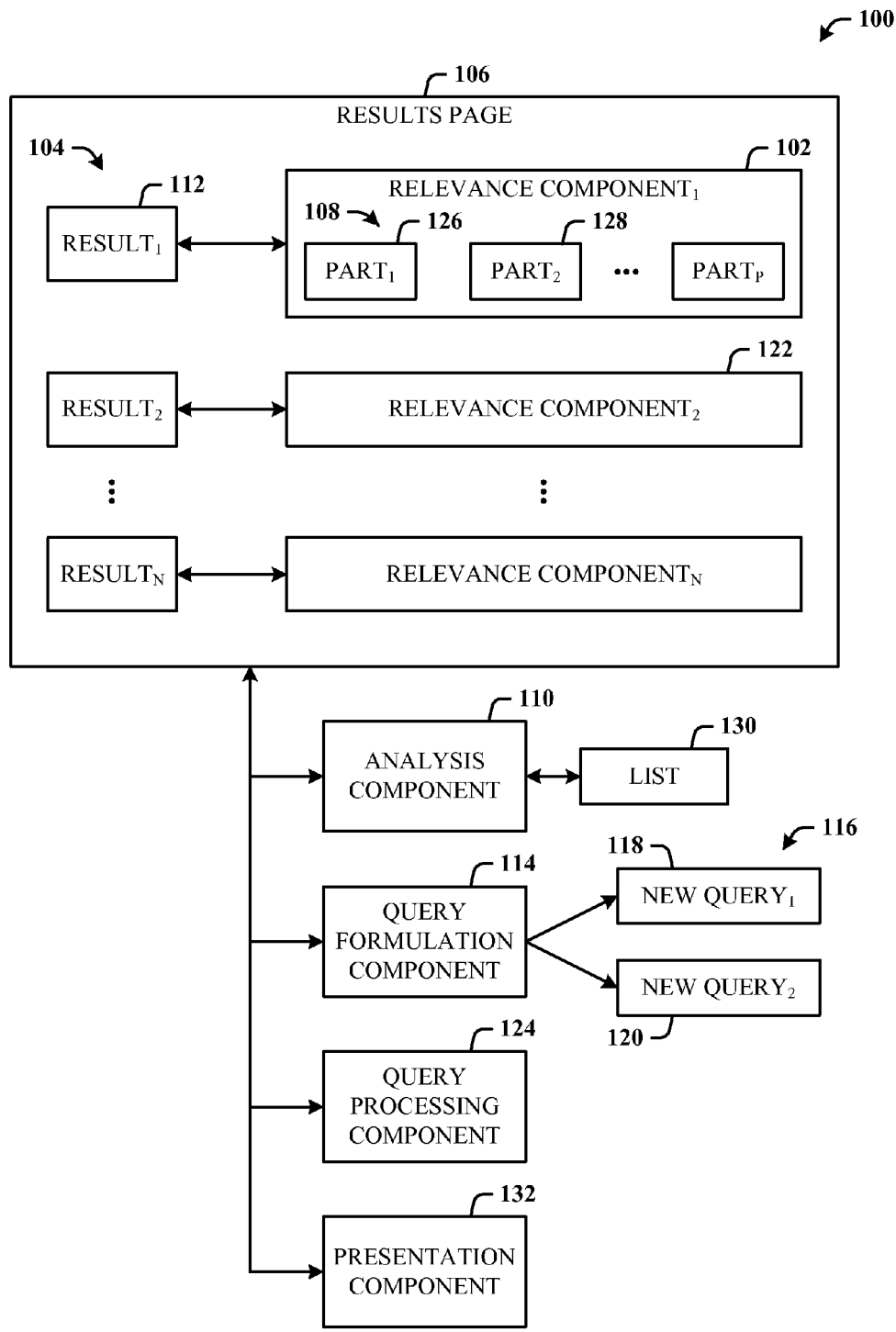
FIG. 1 illustrates a system in accordance with the disclosed architecture.

The disclosed architecture reformulates an original query into new queries for more focused search results. At the time of rendering the search engine results page (SERP), the metadata for each result is analyzed. Topical terms are selected from the metadata and new queries are constructed from the original query as well as the topic terms—a new query for positive feedback and a new query for negative.

In a more specific implementation, the reformulation task is automated by creating and presenting a "More/None" link next to each SERP result that the user can select to provide positive/negative feedback on each result, and thus, redirect the search toward topics of interest. Topical terms are picked from the result metadata and encoded as a new query in the "More/None" link. Each new query is embedded and a new query created on-the-fly in the result link area (to the destination webpage) of each result.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. Generally, the disclosed architecture operates such that at the time of rendering the search engine results page (SERP) for the results of a query, the architecture analyzes each the result (e.g., the metadata associated with each results, the metadata includes, the title, snippet, image, etc., that correspond to each result). The architecture then selects topical terms (more generally, relevance data) from the results and constructs new queries (e.g., two) from the original query as well as the topic terms. One new query can be for positive feedback (e.g., the associated interactive part annotated as "More") and one query can be for negative feedback (e.g., the associated interactive part annotated as "None"). In other implementations, additional new queries can be formulated for the desired purposes.

The architecture can also maintain a list of terms that are never to be used in formulating the new queries for a given relevance component. For example, words such as "and", "in", "the", "from", "answers", etc., can be on the list such that these terms are never used in the new queries. If the only terms available to construct the new query are in that list, then a decision is made to not show the relevance component (using the above example, the More/None link) for that result.

Accordingly, the system 100 can include a relevance component 102 (interactive link(s)) associated with each result 104 of a results page 106. The results page is related to an original query. The relevance component 102 can comprise multiple interactive parts 108 (e.g., the More link and the None link) for feeding back (the selection of which feeds back) positive or negative data as to each result 104.

An analysis component 110 analyzes metadata associated with a given result (e.g., result 112) and selects topical data (e.g., terms) from the given result based on the analysis. A query formulation component 114 formulates new queries 116 (e.g., a new query 118 as a positive feedback query and a new query 120 as a negative feedback query) for association with the interactive parts 108 of the relevance component 102. In other words, new queries are formulated for each relevance component based on the associated result. Here, the new queries 116 are formulated for the relevance component 102. It is to be understood that other new and different queries are also generated and associated with the interactive parts of the other relevance components (e.g., a relevance component 122) and associated results (e.g., RESULT$_2$).

A query processing component 124 processes the new query 118 (e.g., the positive feedback query) associated with an interactive part (e.g., part 126) in response to selection (e.g., user mouse click, voice command, etc.) of the interactive part (part 126), and returns new results for the new query 118. More specifically, the relevance component 102 can comprise a positive feedback interactive part (e.g., part 126) and a negative feedback interactive part (e.g., part 128), that if either is selected, focuses a new search to a topic of interest.

The metadata includes one or more of a title, a snippet, and an image caption, for example, associated with the result. A relevance component (e.g., relevance component 102) is automatically (e.g., dynamically) associated with each result on the results page 106 when the results page 106 is rendered. The query formulation component 114 constructs the new queries 116 from the original query by adding new terms. In another embodiment, the new queries 116 can be constructed and redirected by removing old terms. Additionally, it is to be understood that both adding new terms and removing old terms can be utilized in a single implementation. The analysis component 110 creates and maintains a list 130 of terms that are not to be considered as part of the new queries 116.

The system 100 can further comprise a presentation component 132 that determines when to present the relevance component (e.g., relevance component 102) for a given result, and for viewing and user interaction. For example, if the terms are on the list 130, the relevance components (and interactive parts (or links)) need not be shown to the user.

Figure 2:
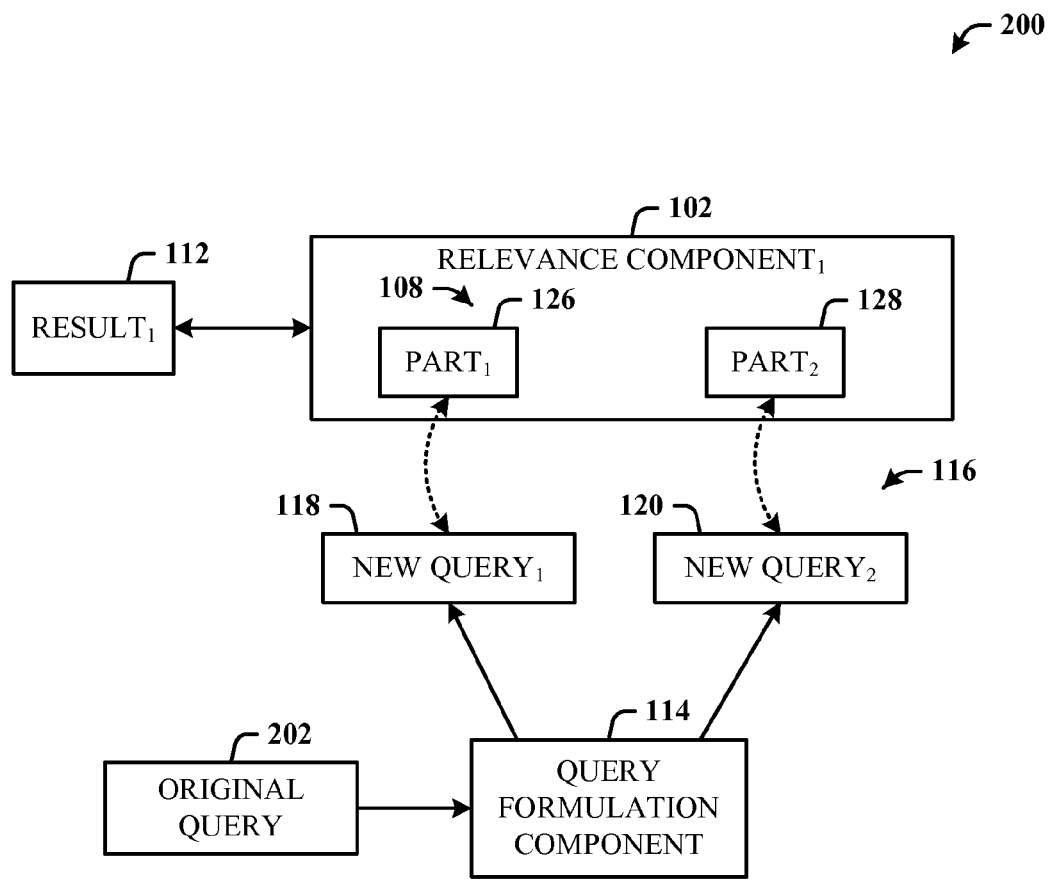
FIG. 2 illustrates a system where the new queries are related to the interactive parts of the relevance component.

FIG. 2 illustrates a system 200 where the new queries 116 are related to the interactive parts 108 of the relevance component 102. Specifically, the query formulation component 114 uses the original query 202 to formulate the new queries 116. Terms of the original query 202 are analyzed (by the analysis component 110) and used to create the new query 118 (e.g., a positive feedback query) and the new query 120 (e.g., a negative feedback query). The new query 118 can then be associated (programmatically) with the interactive part 126, and the new query 120 can then be associated with the interactive part 128. When the user interacts with (selects) the interactive part 126, the new query 118 is automatically processed to focus (redirect) the search results to user-desired topics of interest. Similarly, when the user interacts with (selects) the interactive part 128, the new query 120 (the negative feedback query) is automatically processed to divert the search away from the existing search results of the original query, that are not topics of interest, and hence, more to the desired topics of interest. The negative feedback then facilitates adding negated terms to the list 130.

An advantage of this text-based technique versus a web-graph based technique is that the embedded queries (the interactive parts) are dependent on the original query as well as the result metadata (e.g., title, snippet). Thus, if the same result is returned for two different queries, the embedded queries are different even though the result is the same. Further, this technique scales automatically as it is created on-the-fly (dynamically) for any query-result pair.

FIG. 3 illustrates original search results 300 of a results page based on an original query and the presence of relevance components for one or more of the results. In this example, the original query is "grey goose". The original results 300 show that a second result 302 and a fifth result 304 do not show associated relevance components (here, More/None links). With respect to a third result 306, the architecture identifies the term "Framing" as a topical term, and constructs the following queries, thereby taking advantage of the search engine advanced query operators; query embedded in "More" link:grey goose rankonly:framing, and query embedded in "None" link:grey goose-framing. The first query (for the More link) is a positive feedback query that redirects the original query to more focused results that include "framing". The second query (for the None link) is a negative feedback query that removes the term "framing" from processing of the new query.

FIG. 4 illustrates new search results 400 of a results page based on a new positive feedback (or redirected) query for the original query of FIG. 3. The new results 400 are then returned based on user interaction with the More link. Given that the original query was "grey goose", the reformulated positive feedback query also includes these terms, as well as the term "framing". Accordingly, all results include the term "framing" and "grey goose" in the result metadata (e.g., title, snippet, page link).

FIG. 5 illustrates new search results 500 of a results page based on a new negative feedback (or redirected) query for the original query of FIG. 3. The new results 500 are the returned based on user interaction with the None link. Accordingly, the results can include the terms "grey goose" in the result metadata (e.g., title, snippet, page link), but not the term "framing" as specified in the negative feedback query (-framing").

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
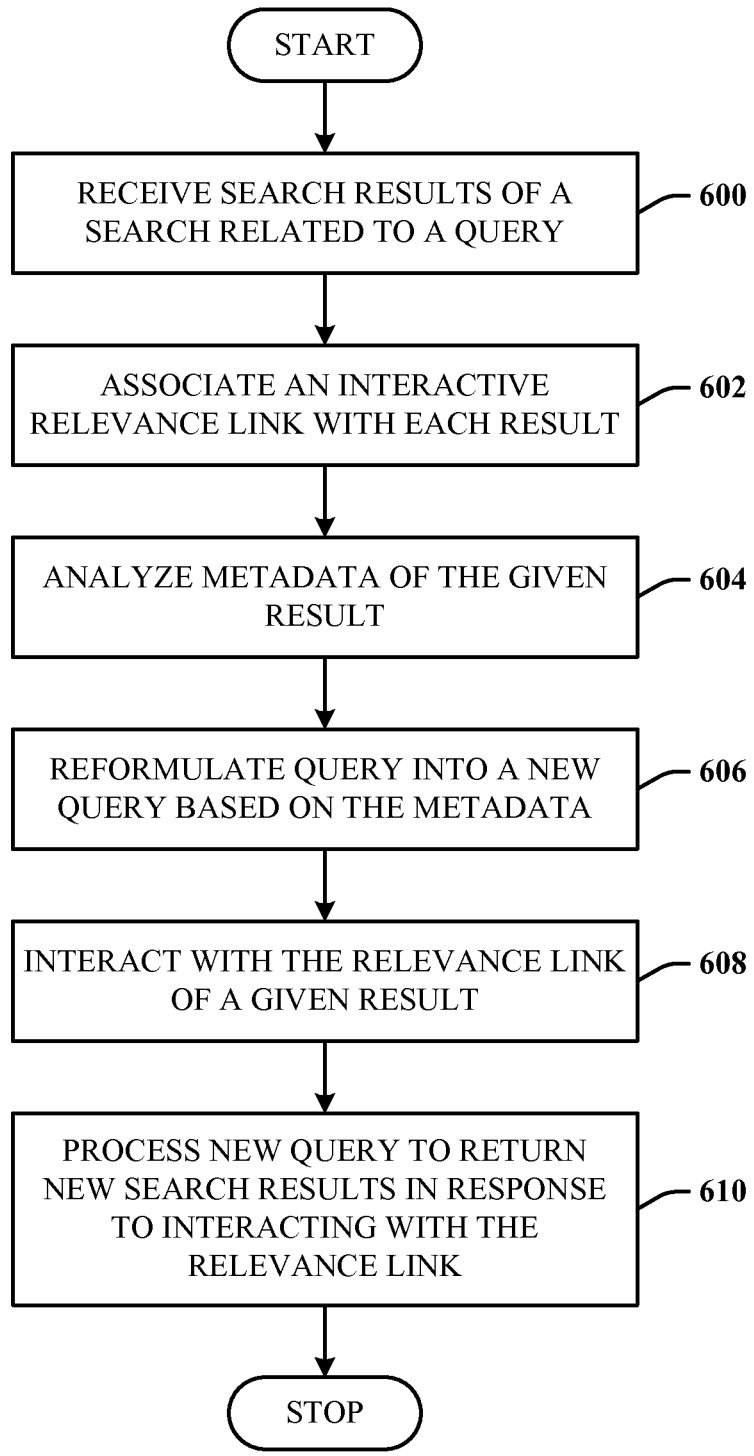
FIG. 6 illustrates a method in accordance with the disclosed architecture.

FIG. 6 illustrates a method in accordance with the disclosed architecture. At 600, search results of a search related to a query are received. These are the original results from the original query. At 602, an interactive relevance link (the relevance component of multiple interactive parts) is associated with each result. At 604, metadata (e.g., title, snippet, link to target webpage, image, etc.) of the given result is analyzed. At 606, the query (the original query) is reformulated into a new query based on the metadata. Terms taken from the original results are added into the new query string. Alternatively, the new query uses term negation to ensure that certain results are not returned by the search engine in the next pass. At 608, the relevance link of a given result is interacted with (e.g., the user selects the More link or the None link). At 610, the new query is processed to return new search results in response to interacting with the relevance link.

Figure 7:
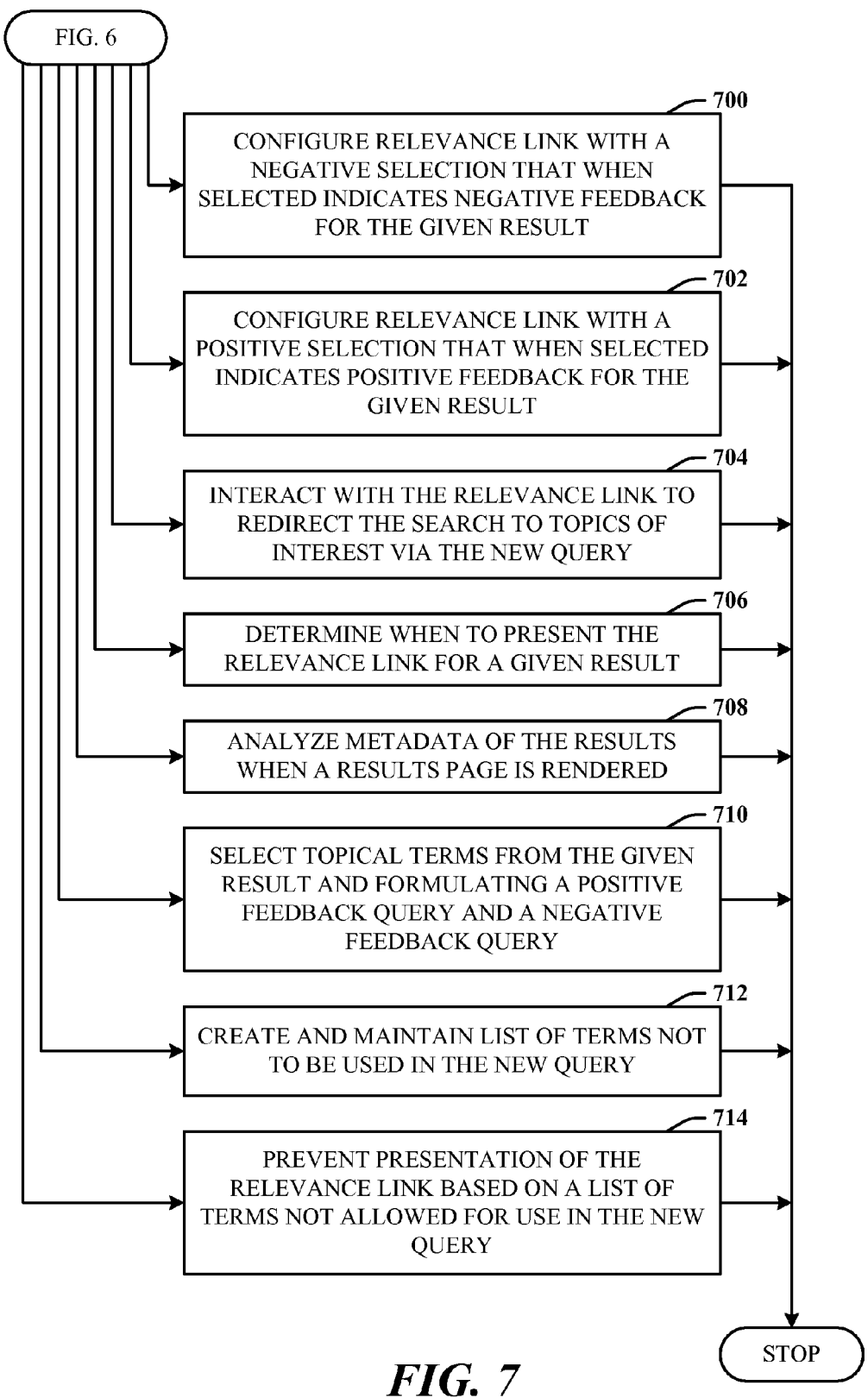
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, the relevance link is configured with a negative selection (e.g., a None link) that when selected indicates negative feedback for the given result. The negative feedback means that term negation is used to remove results that include the specified negated term (e.g., "-framing"). At 702, the relevance link is configured with a positive selection that when selected indicates positive feedback for the given result.

At 704, the relevance link is interacted with to redirect the search to topics of interest via the new query. Here, the user selects the More link. At 706, a determination is made as to when to present the relevance link for a given result. This determination is based on terms being on the list 130. At 708, metadata of the results is analyzed when a results page is rendered. That is, when the results page is rendered, the metadata of each result is analyzed for each corresponding result. At 710, topical terms are selected from the given result and a positive feedback query and a negative feedback query are formulated. At 712, a list of terms not to be used in the new query, is created and maintained. At 714, presentation of the relevance link is prevented based on a list of terms not allowed for use in the new query.

Figure 8:
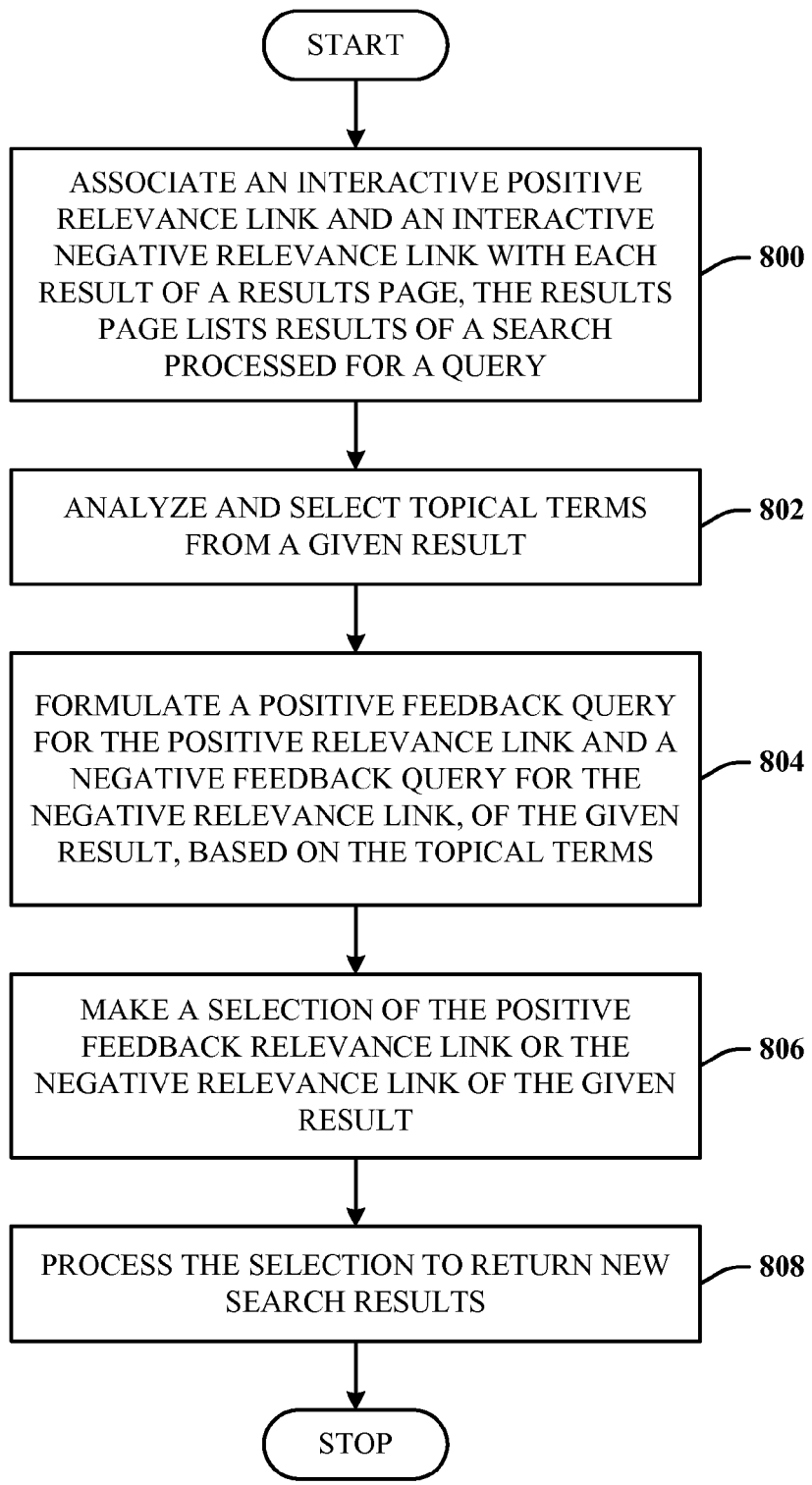
FIG. 8 illustrates an alternative method in accordance with the disclosed architecture.

FIG. 8 illustrates an alternative method in accordance with the disclosed architecture. At 800, an interactive positive relevance link (e.g., the More link) and an interactive negative relevance link (e.g., the None link) are associated with each result of a results page. The results page lists results of a search processed for a query (the original query). At 802, topical terms are analyzed and selected from a given result. At 804, a positive feedback query (e.g., new query 118) is formulated for the positive relevance link (e.g., interactive part 126) and a negative feedback query (e.g., new query 120) is formulated for the negative relevance link (e.g., interactive part 128), of the given result, based on the topical terms. At 806, a selection is made of the positive feedback relevance link or the negative relevance link of the given result. At 808, the selection is processed to return new search results.

Figure 9:
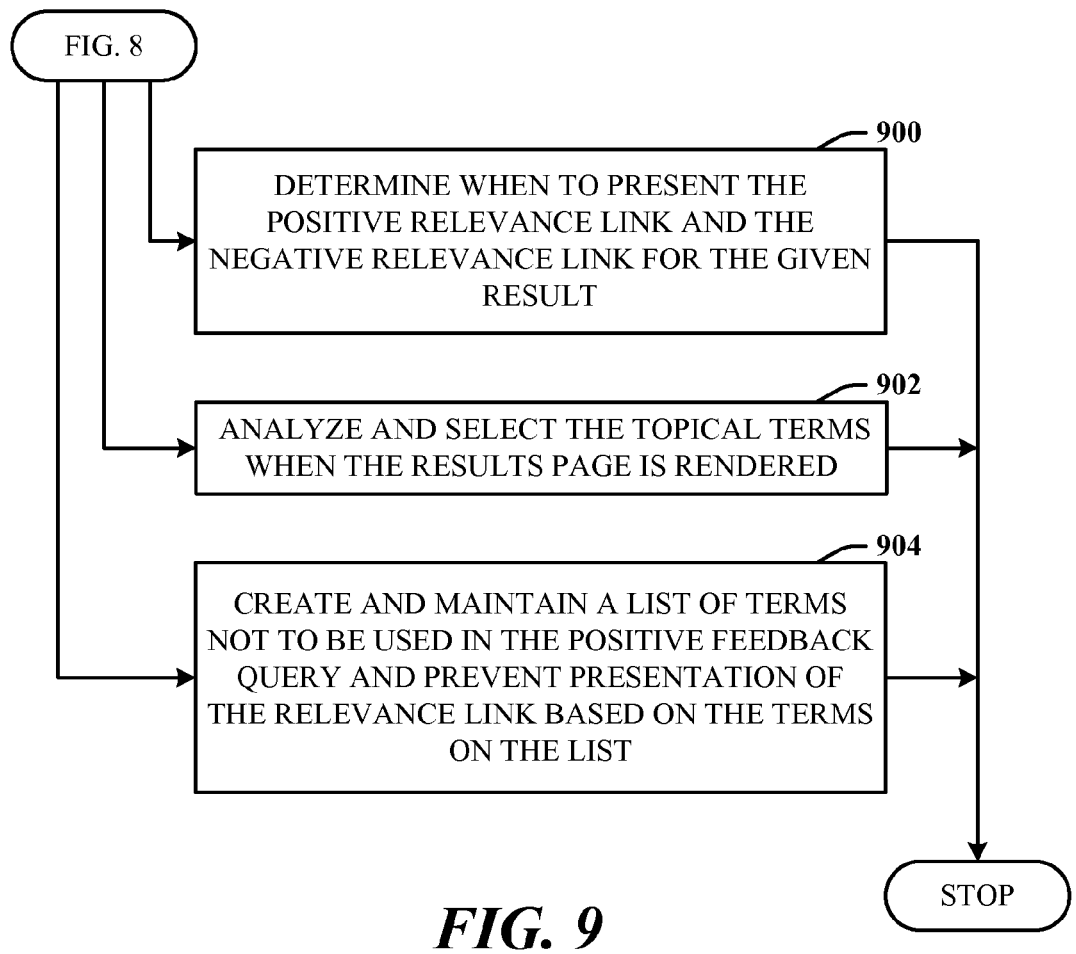
FIG. 9 illustrates further aspects of the method of FIG. 8.

FIG. 9 illustrates further aspects of the method of FIG. 8. At 900, it is determined when to present the positive relevance link and the negative relevance link for the given result. At 902, the topical terms are analyzed and selected when the results page is rendered. At 904, a list of terms not to be used in the positive feedback query is created and maintained, and presentation of the relevance link is prevented based on the terms on the list.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
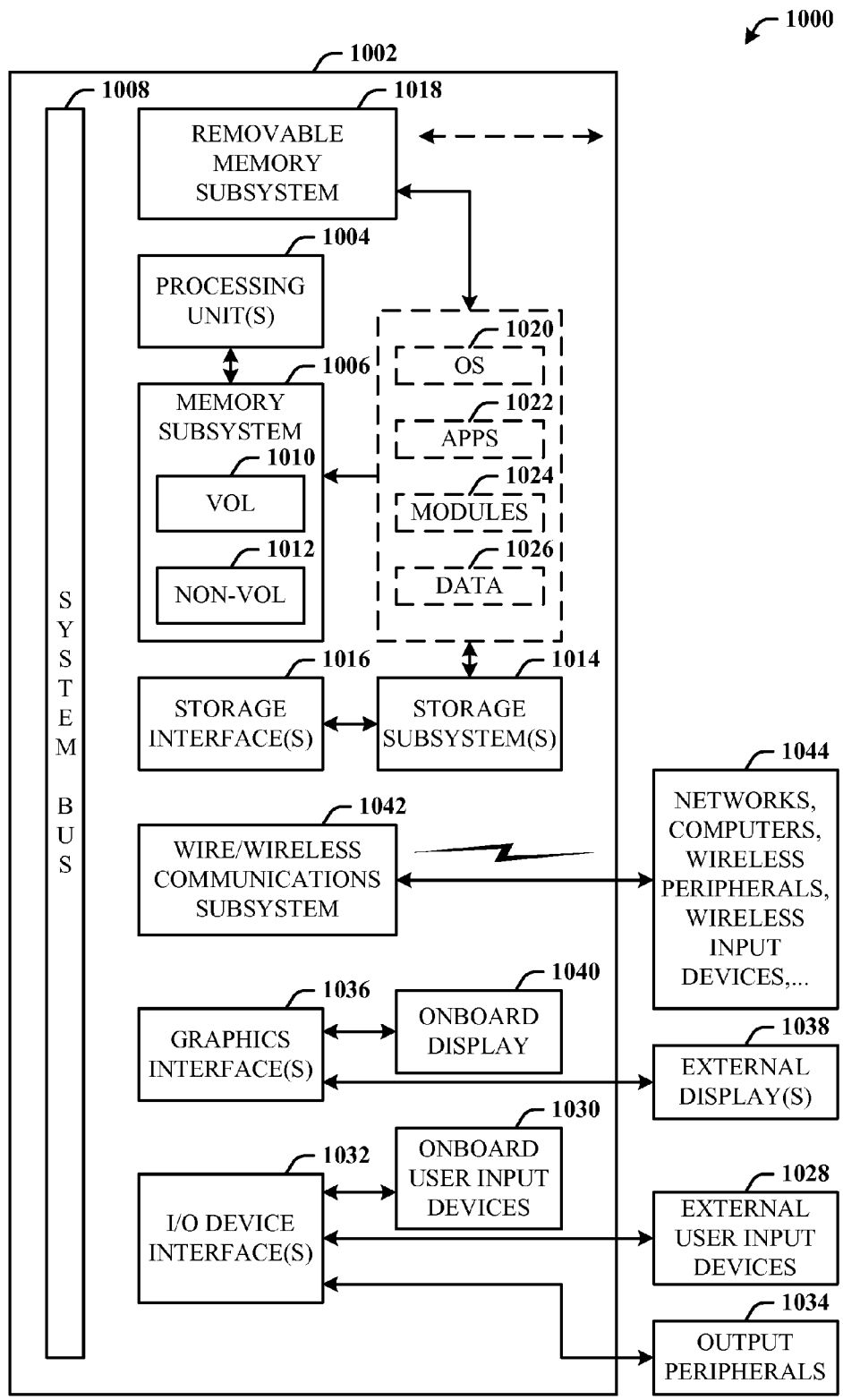
FIG. 10 illustrates a block diagram of a computing system that executes query reformulation and redirection in accordance with the disclosed architecture.

Referring now to FIG. 10, there is illustrated a block diagram of a computing system 1000 that executes query reformulation and redirection in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include the entities and components of the system 100 of FIG. 1, entities and components of the system 200 of FIG. 2, and methods represented by the flowcharts of FIGS. 6-9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example.

These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi- Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a relevance component associated with each result of a results page, the relevance component having an interactive positive relevance as a "more" link configured to enable positive feedback as to each result and an interactive negative relevance as a "none" link configured to enable negative feedback as to each result, the results page related to an original query;
an analysis component configured to automatically analyze metadata associated with each result and automatically select a topical term from each result;
a query formulation component configured to automatically reformulate for each result of the relevance component a new query associated with the "more" link and a new query associated with the "none" link;
a query processing component configured to automatically process the new query associated with selection of the "more" link or the new query associated with selection of the "none" link for each result of the results page, and return new results for the new query, such that selection of the "more" link includes the topical term in the processing of the new search results, or selection of the "none" link indicates negation of the topical term from the processing of the new search results to ensure the new search results do not contain the topical term; and
a microprocessor configured to execute computer-executable instructions in a memory, the execution of the instructions enables at least one of the relevance component, analysis component, query formulation component, or query processing component.

2. The system of claim 1, wherein the metadata of a result includes at least one of a title, a snippet, or an image.

3. The system of claim 1, wherein the relevance component is dynamically associated with each result on the results page when the results page is rendered.

4. The system of claim 1, wherein the query formulation component is configured to construct the new queries from the original query by at least one of adding new terms or removing old terms.

5. The system of claim 1, wherein the analysis component is configured to create and maintain a list of terms, which terms are not to be considered as part of the new query associated with the "more" link or the new query associated with the "none" link.

6. The system of claim 1, further comprising a presentation component configured to determine when to present the relevance component for a given result and for viewing and user interaction.

7. A method performed by a computer system executing machine-readable instructions, the method comprising acts of:
receiving search results of a search related to a query;
automatically associating at least one interactive relevance link with each result for indicating at least one of positive feedback or negative feedback of each result;
automatically analyzing metadata of a given result, the metadata comprising at least one descriptive word from at least one target webpage;
for each result, automatically reformulating the query into two new queries based respectively on the inclusion and exclusion of the at least one descriptive word of the metadata; and
processing one of the two new queries of a given result to return new search results in response to interacting with the corresponding at least one interactive relevance link, where interacting to indicate positive feedback includes the descriptive word in one of the new queries, and interacting to indicate negative feedback negates the descriptive word from the respective other of the new queries.

8. The method of claim 7, further comprising configuring the at least one interactive relevance link with a negative selection that when selected indicates negative feedback for the given result.

9. The method of claim 7, further comprising configuring the at least one interactive relevance link with a positive selection that when selected indicates positive feedback for the given result.

10. The method of claim 7, further comprising interacting with the at least one relevance link to redirect the search to topics of interest via the new query.

11. The method of claim 7, further comprising determining when to present the at least one relevance link for a given result.

12. The method of claim 7, further comprising analyzing metadata of the results when a results page of the search results is rendered.

13. The method of claim 7, further comprising selecting topical terms from the given result and formulating a positive feedback query and a negative feedback query.

14. The method of claim 7, further comprising creating and maintaining a list of terms not to be used in the new queries.

15. The method of claim 7, further comprising preventing presentation of the at least one relevance link based on a list of terms not allowed for use in the new query.

16. A method, performed by a computer system executing machine-readable instructions, the method comprising acts of:
automatically associating an interactive positive relevance link and an interactive negative relevance link with each result of a results page, the results page lists results of a search processed for a query;
automatically analyzing metadata and selecting topical terms from the metadata of each result comprising at least one descriptive word from at least one target webpage;
for each result, automatically reformulating the query into a positive feedback query for the positive relevance link and a negative feedback query for the negative relevance link based respectively on addition and negation of the topical terms; and processing a selection of the positive feedback relevance link of a given result to return new search results based on inclusion of the topical terms formulated into the positive feedback query, or processing a selection of the negative feedback relevance link of the given result to return new search results based on removal of the topical terms from the negative feedback query.

17. The method of claim 16, further comprising determining when to present the positive relevance link and the negative relevance link for the given result.

18. The method of claim 16, further comprising analyzing and selecting the topical terms when the results page is rendered.

19. The method of claim 16, further comprising creating and maintaining a list of terms not to be used in the positive feedback query and preventing presentation of the relevance link based on the terms on the list.

* * * * *